(12) United States Patent
Wentink

(10) Patent No.: US 8,165,154 B2
(45) Date of Patent: Apr. 24, 2012

(54) SYSTEMS AND METHODS FOR RELIABLE BROADCAST AND MULTICAST TRANSMISSION OVER WIRELESS LOCAL AREA NETWORK

(75) Inventor: Maarten Menzo Wentink, Utrecht (NL)

(73) Assignee: Conexant Systems, Inc., Newport Beach, CA (US)

( * ) Notice: Subject to any disclaimer, the term of this patent is extended or adjusted under 35 U.S.C. 154(b) by 795 days.

(21) Appl. No.: 12/046,391

(22) Filed: Mar. 11, 2008

(65) Prior Publication Data
US 2008/0225811 A1 Sep. 18, 2008

Related U.S. Application Data

(60) Provisional application No. 60/906,331, filed on Mar. 12, 2007.

(51) Int. Cl.
*H04L 12/413* (2006.01)
(52) U.S. Cl. ........................................................ 370/455
(58) Field of Classification Search .................... None
See application file for complete search history.

(56) References Cited

U.S. PATENT DOCUMENTS

| | | | |
|---|---|---|---|
| 6,707,867 B2 | 3/2004 | Diepstraten | |
| 6,879,567 B2 | 4/2005 | Callaway | |
| 6,915,477 B2 * | 7/2005 | Gollamudi et al. | 714/774 |
| 7,149,213 B1 | 12/2006 | Rosner | |
| 7,280,495 B1 | 10/2007 | Zweig et al. | |
| 7,283,563 B1 | 10/2007 | Allan | |
| 7,349,349 B2 | 3/2008 | Acharya et al. | |
| 7,457,973 B2 | 11/2008 | Liu | |
| 7,522,564 B2 | 4/2009 | Kakumaru | |
| 7,522,935 B2 * | 4/2009 | Rey et al. | 455/522 |
| 7,564,826 B2 | 7/2009 | Sherman | |
| 7,570,612 B1 | 8/2009 | Loc et al. | |
| 7,613,109 B2 | 11/2009 | Jha | |
| 7,817,961 B2 | 10/2010 | Sinivaara | |
| 7,852,790 B2 | 12/2010 | Furuishi | |
| 2003/0012176 A1 | 1/2003 | Kondylis et al. | |
| 2004/0100898 A1 | 5/2004 | Amin-Appiah | |
| 2004/0257986 A1 | 12/2004 | Jha | |
| 2004/0264504 A1 * | 12/2004 | Jin | 370/469 |
| 2005/0009512 A1 | 1/2005 | Rue | |
| 2005/0124294 A1 * | 6/2005 | Wentink | 455/41.2 |
| 2006/0072488 A1 * | 4/2006 | Meier | 370/312 |
| 2007/0014269 A1 | 1/2007 | Sherman | |
| 2007/0060043 A1 | 3/2007 | Qi et al. | |

(Continued)

OTHER PUBLICATIONS

IEEE Standard for Information Technology-Telecommunications and Information Exchange Between Systems-LAN/MAN Specific Requirements; Part 11: Wireless Medium Access Control (MAC) and physical layer (PHY) specifications; LAN/MAN Standards Committee; Mar. 8, 2007.

(Continued)

*Primary Examiner* — Chi Pham
*Assistant Examiner* — Fan Ng
(74) *Attorney, Agent, or Firm* — Farjami & Farjami LLP

(57) ABSTRACT

Broadcast and multicast (BM) systems have not been reliable in the wireless local area networks. Higher bandwidth and more reliable BM transmissions are necessitated by video and audio applications. A class of BM reliable frames is transmitted at a higher rate. The access point performs some rudimentary collision avoidance to enhance reliability, and individual stations are given the ability to send feedback to the access point regarding the quality of the transmission.

26 Claims, 8 Drawing Sheets

U.S. PATENT DOCUMENTS

| | | | |
|---|---|---|---|
| 2007/0121521 | A1 | 5/2007 | D'Amico et al. |
| 2007/0127421 | A1 | 6/2007 | D'Amico et al. |
| 2007/0153789 | A1 | 7/2007 | Barker et al. |
| 2008/0031200 | A1* | 2/2008 | Tang .............................. 370/338 |
| 2008/0151814 | A1 | 6/2008 | Jokela |
| 2008/0159362 | A1* | 7/2008 | Gelbman et al. .............. 375/219 |
| 2009/0010191 | A1 | 1/2009 | Wentink |
| 2009/0238133 | A1 | 9/2009 | Sakoda |
| 2009/0274082 | A1 | 11/2009 | Wentink |
| 2010/0296495 | A1 | 11/2010 | Lino et al. |

OTHER PUBLICATIONS

U.S. Appl. No. 12/046,946 File History.
U.S. Appl. No. 12/047,021 File History.
U.S. Appl. No. 12/047,210 File History.
U.S. Appl. No.: 12/046,946 Non-Final OA dated Dec. 22, 2010.
U.S. Appl. No.: 12/046,946 Resp. to Non-Final OA as filed Mar. 21, 2011.
U.S. Appl. No.: 12/046,946 Notice of Allowance dated Apr. 8, 2011.
U.S. Appl. No.: 12/046,946 Notice of Allowance dated May 26, 2011.
U.S. Appl. No.: 12/047,021 Non-Final OA dated Jan. 11, 2011.
U.S. Appl. No.: 12/047,021 Resp. to Non-Final OA as filed Apr. 11, 2011.
U.S. Appl. No.: 12/047,021 Final OA dated Jun. 9, 2011.
U.S. Appl. No.: 12/047,021 Resp. to Final OA as filed Aug. 9, 2011.
U.S. Appl. No.: 12/047,210 Non-Final OA dated Feb. 16, 2011.
U.S. Appl. No.: 12/047,210 Resp. to Non-Final OA as filed May 16, 2011.
U.S. Appl. No.: 12/047,210 Final OA dated Jun. 16, 2011.
U.S. Appl. No.: 12/047,210 Resp. to Final OA as filed Aug. 16, 2011.

* cited by examiner

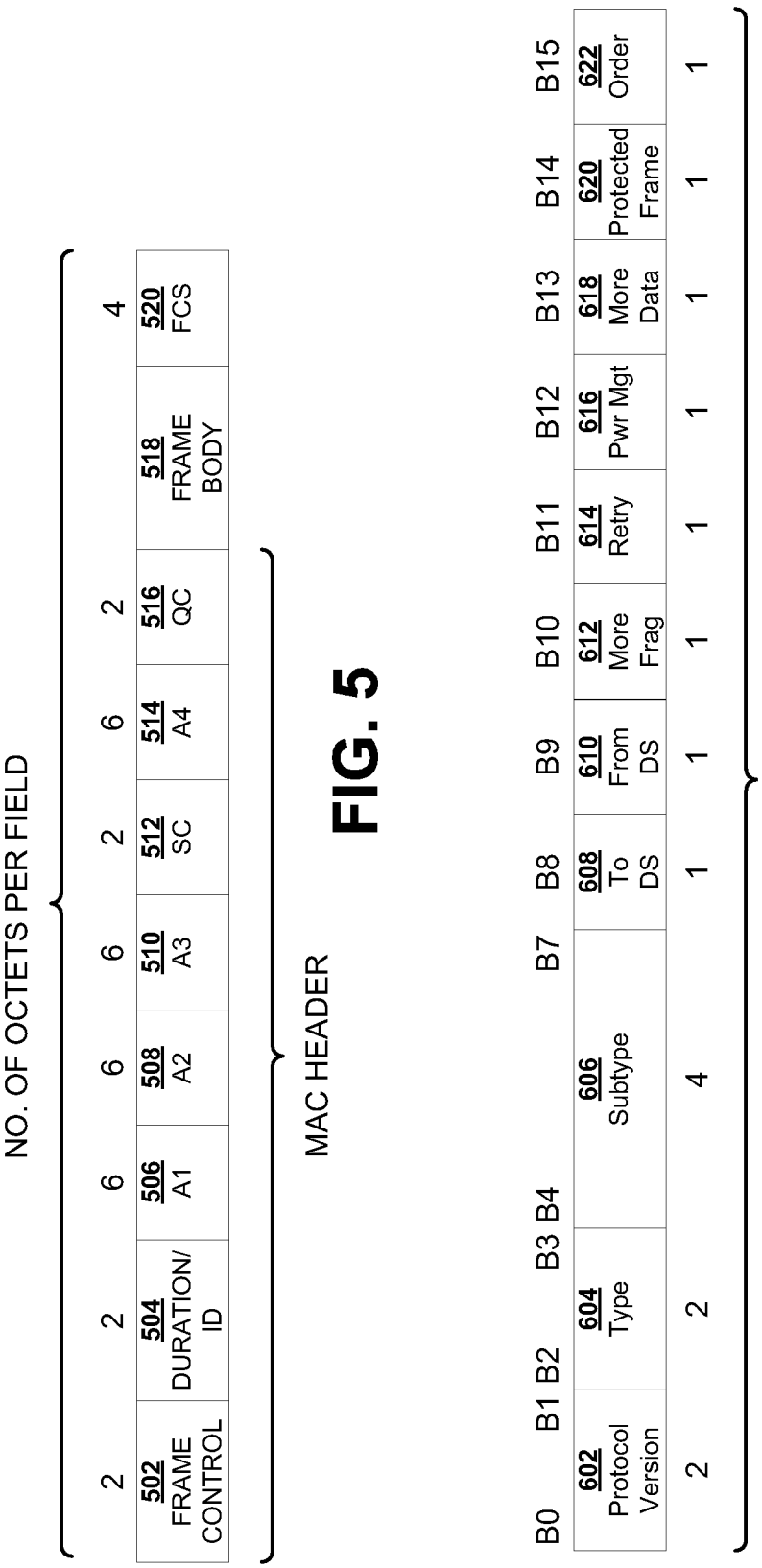

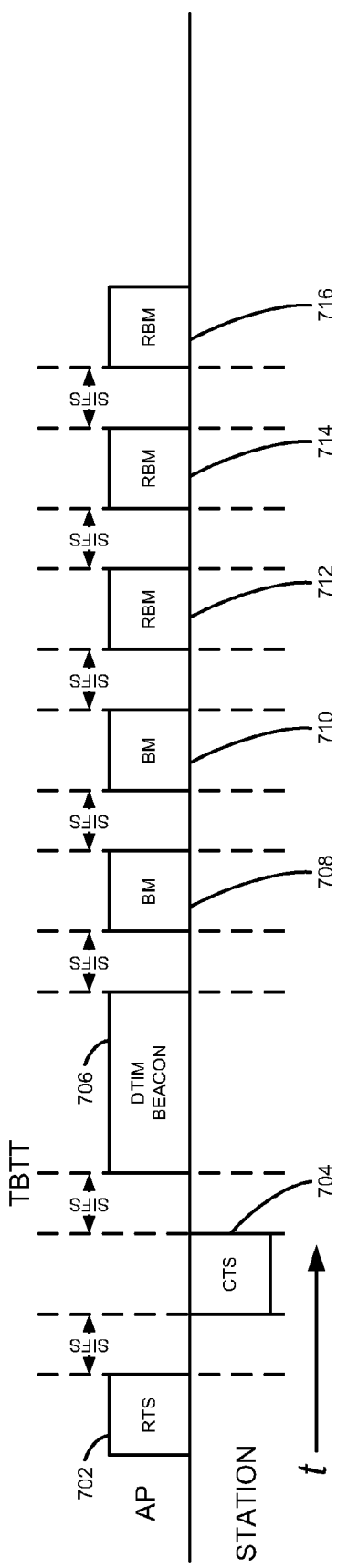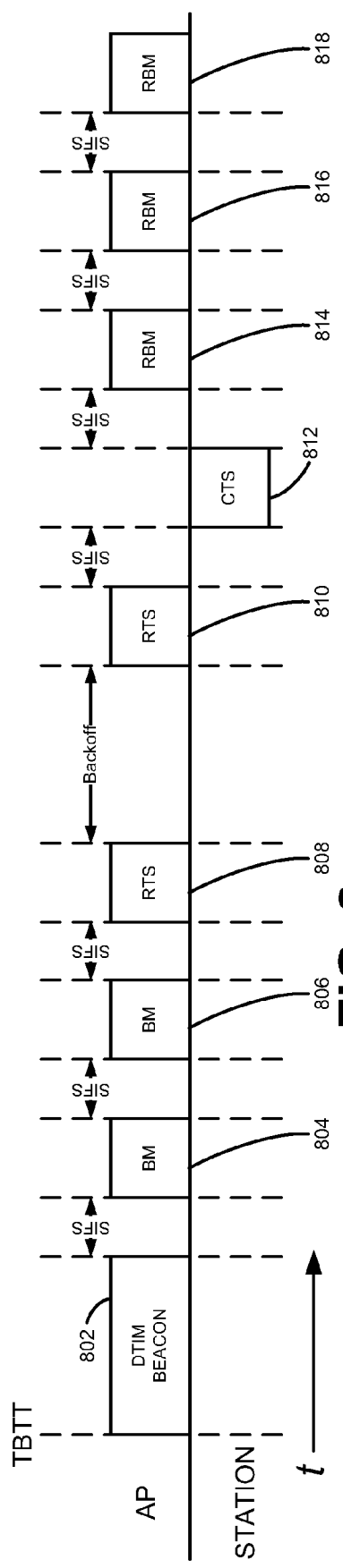

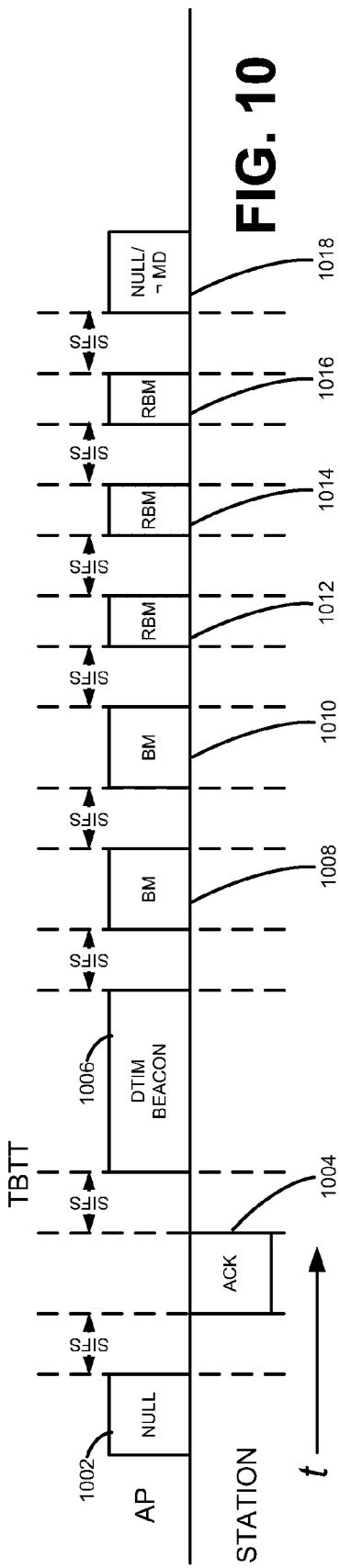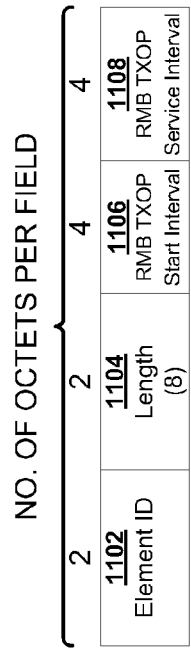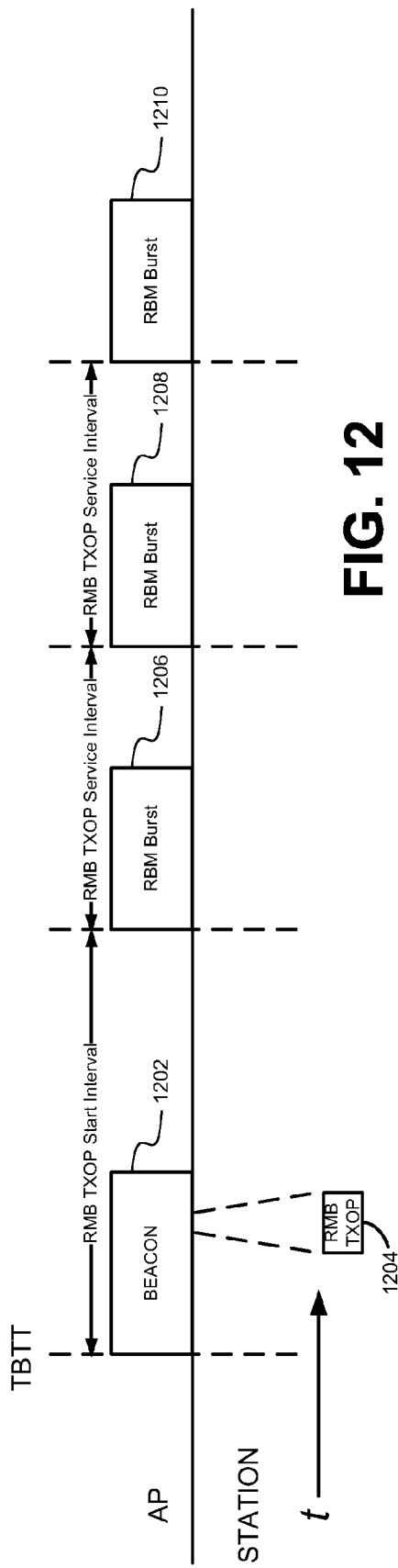

| 1302 MAC header | 1304 Category | 1306 Action | 1308 Length | 1310 MC Group Address | 1310 RBM Feedback | 520 FCS |
|---|---|---|---|---|---|---|
| 24-32 | 2 | 2 | 1 | 6 | n | 6 |

NO. OF OCTETS PER FIELD

FIG. 13

SYSTEMS AND METHODS FOR RELIABLE BROADCAST AND MULTICAST TRANSMISSION OVER WIRELESS LOCAL AREA NETWORK

CROSS-REFERENCE TO RELATED APPLICATION

Under 35 U.S.C. 119, this application claims priority to, and the benefit of, U.S. Provisional Patent Application entitled, "Reliable Broadcast/Multicast (RBM)," having Ser. No. 60/906,331, filed on Mar. 12, 2007, which is incorporated by reference in its entirety.

BACKGROUND OF THE INVENTION

1. Field of the Invention

The present disclosure generally relates to wireless communications and more particularly relates to systems and methods for improving the reliability of multicast/broadcast traffic from an access point.

2. Background Information

Among other things, FIG. 1 illustrates a typical network configuration for communicating data between stations via an access point in a wireless local area network (WLAN) or 802.11-based network. As illustrated in the non-limiting example of FIG. 1, a network 140 may be coupled to access point 130. In some embodiments, the network 140 may be the Internet, for example. Access point 130 can be configured to provide wireless communications to various wireless devices or stations 110, 120, 124. Depending on the particular configuration, the stations 110, 120, 124 may be a personal computer (PC), a laptop computer, a mobile phone, a personal digital assistant (PDA), and/or other device configured for wirelessly sending and/or receiving data. Furthermore, the access points 130 may be configured to provide a variety of wireless communications services, including but not limited to: Wireless Fidelity (WIFI) services, Worldwide Interoperability for Microwave Access (WiMAX) services, and wireless session initiation protocol (SIP) services. Furthermore, the stations 110, 120, 124 may be configured for WIFI communications (including, but not limited to 802.11, 802.11b, 802.11a/b, 802.11g, and/or 802.11n).

Access point 130 can transmit to a single station such as station 110 which is known as a unicast transmission. Access point 130 can also transmit to all stations which is known as a broadcast transmission. Access point 130 can also transmit to a subset of all stations which is known as multicast transmissions.

As illustrated in FIG. 2, access point 130 transmits a beacon frame at a target beacon transmission time (TBTT). The beacon frame comprises a beacon interval which indicates the period of time between beacons. In the timeline shown here, beacon frames 202, 204, 206, 208, and 210 represent five beacon frames transmitted by the access point. The frequency of the beacon frames is represented by the period equal to the beacon interval. Each of the beacon frames in the example contains a traffic indication map (TIM) element. Specifically, beacon frames 202, 204, 206, and 210 contain TIM elements 212, 214, 216, 218 and 220, respectively. Periodically, the TIM element in the beacon frame is a delivery traffic indication map (DTIM), which indicates after the beacon frame the access point will transmit buffered multicast or broadcast data. This beacon frame is sometimes referred to as a DTIM beacon frame.

In the past, broadcast/multicast (BM) traffic in wireless network was generally used to control traffic. Under such context, BM frames were infrequent and short. Also, BM frames were transmitted at a basic rate due to the requirement that all associated stations should be able to receive it. In addition BM traffic was not reliable because it is not acknowledged. However, in today's networking environment there is a large market segment for delivery of streaming media such as audio and video streams using multicast streams. To improve the quality of streaming video and audio multicast, reliability needs to be improved and the throughput rate of the multicast data transmission needs to be higher. Accordingly, various needs exist in the industry to address the aforementioned deficiencies and inadequacies.

SUMMARY OF INVENTION

In brief, a method for improving the reliability of BM traffic comprises several steps. First is that each frame is marked as a reliable frame. Second, a collision avoidance message exchange takes place prior to the transmission of an RBM burst. If a collision is detected, the collision avoidance message exchange is attempted again after a backoff period. This message exchange can comprise a request to send/clear to send sequence, a NULL/acknowledgement (ACK) sequence or a data/ACK sequence. Additionally, to accommodate the large amounts of traffic, the transmission rate of the RBM burst can be set to a higher physical layer (PHY) rate. The RBM bursts can be terminated by transmitting a NULL frame with the more data bit not set in the frame control field.

A further enhancement in the method includes adjusting the transmission rate based on feedback from individual stations to feedback quality and transmission rate parameters to the access point, such as the packet error rate (PER), the received signal strength indication (RSSI), the modulation coding scheme (MCS) or a suggested rate.

Another variation to the method allows the scheduling of the transmission of the RBM burst. It can take place at the usual BM time right after a DTIM beacon frame or it can be scheduled using a RBM transmit opportunity (TXOP) schedule informational element.

Access points and stations comprising a processor, network interfaces and a memory can be configured to interoperate with the methods and variations described above by implementing additional logical modules as instructions in the memory. The logic can then be carried out by the processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 shows the format for a data frame;

FIG. 6 shows a further breakdown of the frame control field;

FIG. 7 shows an example of the use of the request to send (RTS)/clear to send (CTS) sequence for collision avoidance;

FIG. 8 shows an alternate timeline where after a DTIM beacon and regular BM frames, the access point transmits RTS/CTS prior to transmitting the RBM burst;

FIG. 10 shows an exemplary timeline where RBM frames are transmitted at a higher rate;

FIG. 11 shows an exemplary format for a RBM TXOP schedule element;

FIG. 12 illustrates a typical timing using a RBM TXOP schedule; and

FIG. 13 illustrates a format for feedback to the access point for a specific RBM stream.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
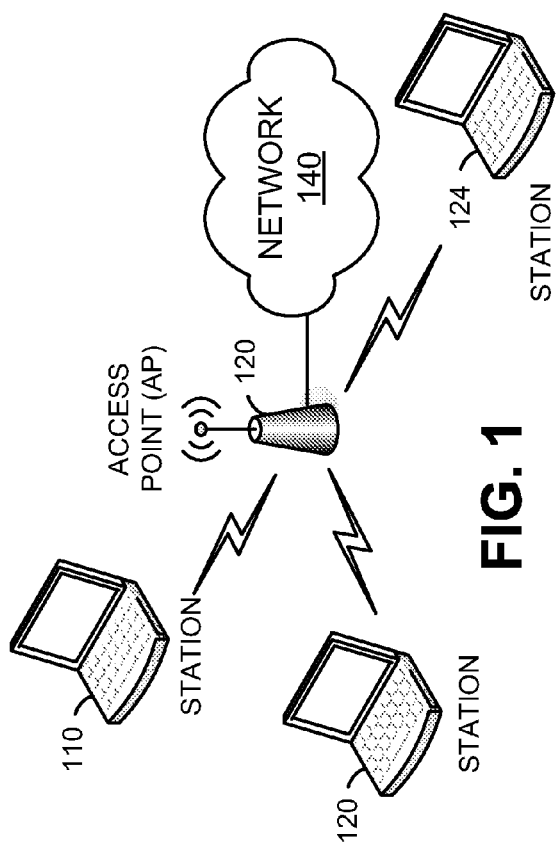
FIG. 1 illustrates a typical network configuration for communicating data between stations via an access point in a WLAN or 802.11-based network.
Figure 2:
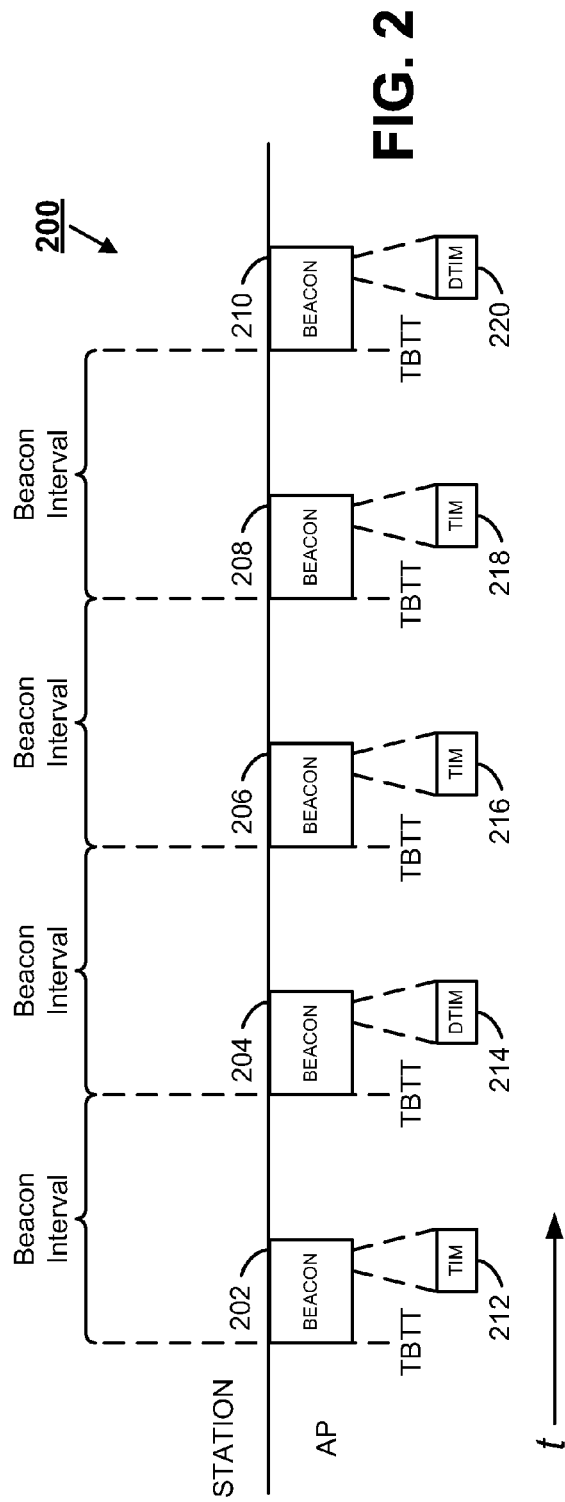
FIG. 2 illustrates a typical transmission timing of beacon frames from an access point.
Figure 3:
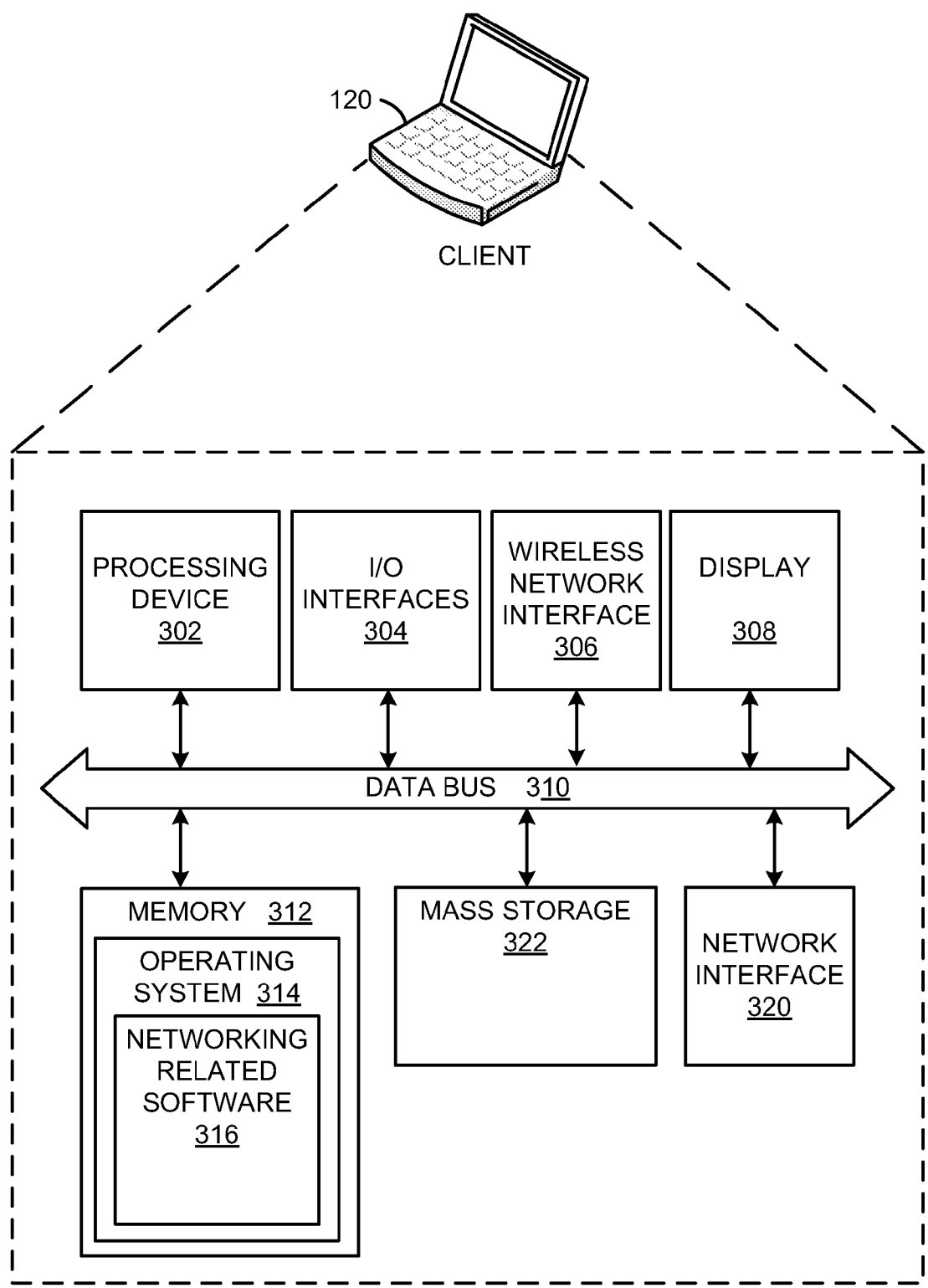
FIG. 3 illustrates an embodiment of one of the wireless devices/stations shown in FIG. 1.

FIG. 3 illustrates an embodiment of one of the wireless devices/stations shown in FIG. 1. It can be configured to receive and process messages as disclosed below. Generally speaking, station 120 can comprise any one of a wide variety of wireless computing devices, such as a desktop computer, portable computer, dedicated server computer, multiprocessor computing device, cellular telephone, PDA, handheld or pen based computer, embedded appliance and so forth. Irrespective of its specific arrangement, station 120 can, for instance, comprise memory 312, processing device 302, a number of input/output interfaces 304, wireless network interface device 306, display 308, and mass storage 322, wherein each of these devices is connected across one or more data buses 310. Optionally, station 120 can also comprise a network interface device 320, also connected across one or more data buses 310.

Processing device 302 can include any custom made or commercially available processor, a central processing unit (CPU) or an auxiliary processor among several processors associated with the computing device 120, a semiconductor based microprocessor (in the form of a microchip), a macroprocessor, one or more application specific integrated circuits (ASICs), a plurality of suitably configured digital logic gates, or generally any device for executing instructions.

Input/output interfaces 304 provide any number of interfaces for the input and output of data. For example, where station 120 comprises a PC, these components may interface with user input device 304, which may be a keyboard or a mouse. Where station 120 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

Wireless network interface device 306 and optionally network interface device 320 comprise various components used to transmit and/or receive data over a network environment. By way of example, these may include a device that can communicate with both inputs and outputs, for instance, a modulator/demodulator (e.g., a modem), wireless (e.g., radio frequency (RF)) transceiver, a telephonic interface, a bridge, a router, network card, etc. Station 120 can use wireless network interface device 306 to communicate with access point 130.

With further reference to FIG. 3, memory 312 can include any one of a combination of volatile memory elements (e.g., random-access memory (RAM), such as DRAM, and SRAM, etc.) and nonvolatile memory elements (e.g., flash, read only memory (ROM), nonvolatile RAM, etc.). Mass storage 322 can also include nonvolatile memory elements (e.g., flash, hard drive, tape, CDROM, etc.). Memory 312 comprises software which may include one or more separate programs, each of which includes an ordered listing of executable instructions for implementing logical functions. Often, the executable code can be loaded from nonvolatile memory elements including from components of memory 312 and mass storage 322. Specifically, the software can include native operating system 314, one or more native applications, emulation systems, or emulated applications for any of a variety of operating systems and/or emulated hardware platforms, emulated operating systems, etc. These may further include networking related software 316 which can further comprise a communications protocol stack comprising a physical layer, a link layer, a network layer and a transport layer. Network related software 316 can be used by processing device 302 to communicate with access point 130 through wireless network interface 306 and can further include logic that causes the station to receive RBM traffic. In particular, the software can cause the station to receive the RBM frames after a DTIM beacon or at a predetermined time relative to a TBTT. Furthermore, the software can cause the station to give feedback to access point 130 regarding the desired data rate for the RBM transmissions. It should be noted, however, that the logic for performing these processes can also be implemented in hardware or a combination of software and hardware. One of ordinary skill in the art will appreciate that the memory 312 can, and typically will, comprise other components which have been omitted for purposes of brevity.

Figure 4:
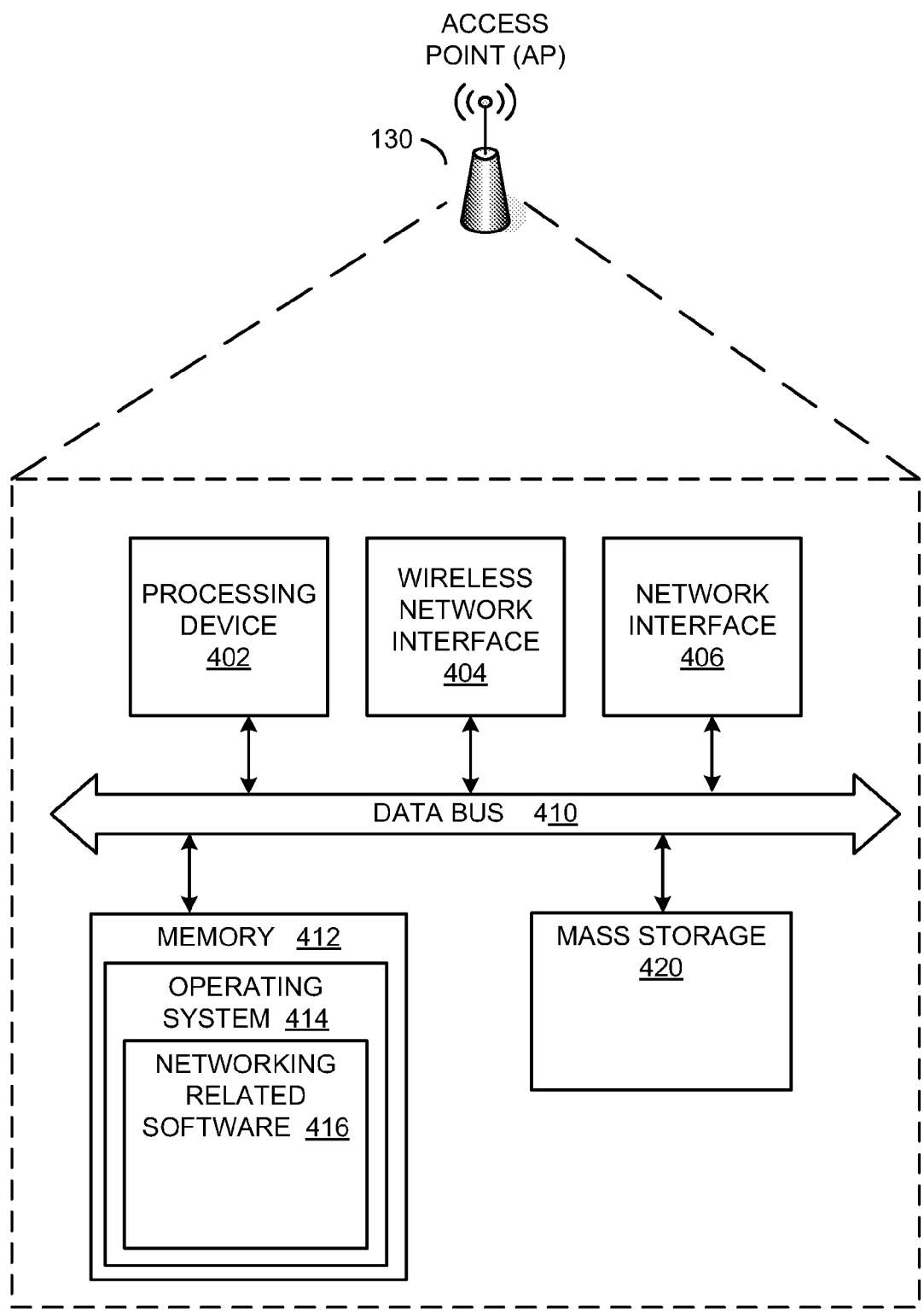
FIG. 4 illustrates an embodiment of the access point shown in FIG. 1.

FIG. 4 illustrates an embodiment of one of the access point shown in FIG. 1. It can be configured to receive and process messages as disclosed below. Generally speaking, station 120 can comprise any one of a wide variety of network functions, including network address translation (NAT), routing, dynamic host configuration protocol (DHCP), domain name services (DNS) and firewall functions. Irrespective of its specific arrangement, the stations 120 can, for instance, comprise memory 412, a processing device 402, wireless network interface 404, network interface 406, and nonvolatile storage 424, wherein each of these devices is connected across one or more data buses 410.

Processing device 402 can include any custom made or commercially available processor, a CPU or an auxiliary processor among several processors associated with access point 130, a semiconductor based microprocessor (in the form of a microchip), a macroprocessor, one or more ASICs, a plurality of suitably configured digital logic gates, or generally any device for executing instructions.

Wireless network interface device 404 and network interface device 406 comprise various components used to transmit and/or receive data over a network environment. By way of example, either interface may include a device that can communicate with both inputs and outputs, for instance, a modulator/demodulator (e.g., a modem), wireless (e.g., RF) transceiver, a telephonic interface, a bridge, a router, network card, etc. Access point 130 typically uses wireless network interface device 404 to communicate with nearby stations and network interface device 406 to communicate with network 140. In some implementations, the two devices can be combined into one physical unit.

With further reference to FIG. 4, memory 412 can include any one of a combination of volatile memory elements (e.g., RAM, such as DRAM, and SRAM, etc.) and nonvolatile memory elements (e.g., flash, ROM, nonvolatile RAM, hard drive, tape, CDROM, etc.). Memory 412 comprises software which may include one or more separate programs, each of which includes an ordered listing of executable instructions for implementing logical functions. Often, the executable code and persistent configuration parameters can be loaded from nonvolatile memory elements including from components of memory 412. Specifically, the software can include native operating system 414, one or more native applications, emulation systems, or emulated applications for any of a variety of operating systems and/or emulated hardware platforms, emulated operating systems, etc. These may further include networking related software 422 which can further comprise a communications protocol stack comprising a physical layer, a link layer, a network layer and a transport layer. These may further include networking related software 416 which can further comprise a communications protocol stack comprising a physical layer, a link layer, a network layer and a transport layer. Network related software 416 can be used by processing device 402 to communicate with access point 130 through wireless network interface 406 and can further include logic for marking each frame in an RBM transmission as reliable, for detecting collisions and for transmitting RBM traffic through wireless network interface 406 at the prescribed time. Furthermore, the software can comprise logic for adjusting the data rate of the RBM transmissions, including receiving feedback from one or more stations. It should be noted, however, that the logic for performing these processes can also be implemented in hardware or a combination of software and hardware. One of ordinary skill in the art will appreciate that the memory 412 can, and typically will, comprise other components which have been omitted for purposes of brevity.

FIG. 5 shows the format for a data frame. Fields 502, 504, 506, 508, 510, 512, 514 and 516 are collectively referred to as the Medium Access Control (MAC) header. Frame control field 502 is a two octet fixed field indicative of properties of the frame as defined by the particular standard, it comprises a bit which when set indicates the frame is protected. Duration/ID field 504 is a two octet fixed field which comprises either duration information or identification information depending on the frame use as defined by the particular standard. Address fields 506, 508, 510, and 514 are used to specify various address parameters. Typically, in a multicast or broadcast application, address field 506 which is the receiver address is set to a multicast or broadcast address. Address field 508 which is the sender address is usually set to the basic service set identification (BSSID). Address field 510 which is usually the BSSID field is set to the BSSID. Address field 514 is optional and is not used in a typical multicast or broadcast application. Sequence control field 512 is a two octet fixed field which comprises a fragment number and a sequence number. The fragment number is used when a frame is fragmented to keep track of the fragments. The sequence number is incremented each time a station transmits a message. Quality of service (QoS) control field 516 is a two octet field used to carry QoS parameters. The lowest four bits of the QoS field are the traffic identification (TID) subfield. Depending on the context, the TID subfield can take different meaning, but in context of this disclosure, the TID comprises a user priority (UP).

After the MAC header, the data frame includes frame body 518 which contains the payload. Frame body 518 is encrypted as specified by the standard if the frame is protected. Finally, frame check sequence field 520 is a four octet fixed field indicative of the integrity of the frame. The specific integrity check is specified by the standard, but as an example, some standards use a cyclic redundancy code (CRC).

FIG. 6 shows a further breakdown of the frame control field. Protocol version subfield 602 is a two bit subfield and is indicative of the version of the standard being used. A device that receives a frame with a higher revision level than it supports will discard the frame without indication to the sender. Type subfield 604 is a two bit subfield and is indicative of the frame type, control, data and management. Subtype subfield 606 is a four bit subfield and further identifies the function of each frame. The number of subtypes is numerous and can be found in any of the relevant standards. "To DS" subfield 608 and "from DS" subfield 610 are each one bit subfield. They indicate whether the frame is destined for the distribution system (DS) or exiting the DS, respectively. Generally, the access point is the access point to the DS. There are various meanings to the various combinations which can readily be found in the appropriate standards.

More fragments subfield 612 is a one bit subfield and is set to 1 in all data or management type frames that have another fragment to follow. It is set to zero in all other frames. Retry subfield 614 is a one bit subfield and is set to 1 in any data or management type frame that is a retransmission of an earlier frame. It is set to zero in all other frames. A receiver uses this indication to aid in the process of eliminating duplicate frames. Power management subfield 616 is a one bit subfield and is used to indicate the power management mode of a station. A value of one indicates that the station will be in power-save mode after the completion of the current frame exchange. A value of zero indicates that the station will be in active mode. This subfield is always set to zero in frames transmitted by an access point. More data 618 subfield is a one bit subfield and is used to indicate to a station in standby that there is more data buffered for that station. In general it is used to indicate that there are more frames in a given burst. The specific use may vary depending on the type of transmission. The frames can be unicast or multicast data and can be data or management frames. Protected Frame subfield 620 is a one bit subfield and is set to one if the frame body field contains information that has been processed by a cryptographic encapsulation algorithm. It is set to zero all other times. Order subfield 622 is a one bit subfield and is set to one in any data type frame which is being transferred using the StrictlyOrdered service class, as defined in the specific standard, (e.g., 802.11). This subfield is set to zero in all other frames.

In general in a multicast environment it is not practical to have all frames acknowledged, but there are many steps that can be taken to improve reliability. First, there should be a method of defining a subset of BM traffic, called RBM traffic. One way to identify RBM frames is to associate RBM by specific UPs such as video and voice (audio) which have already been defined in some standards (such as 802.11e). The designation of a subset of BM called RBM allows RBM traffic to be treated differently in a more reliable method.

As described in FIG. 3, periodically beacon frames are transmitted and after a DTIM beacon frame, BM traffic is sent. RBM traffic can also be sent at this time. In order to improve the reliability of RBM traffic, prior to transmitting an RBM traffic burst where a burst means a sequence of frames separated by short interframe space (SIFS) intervals and not a longer backoff interval, a collision avoidance protocol is followed. For example, prior to a RBM burst, a RTS frame can be sent and a CTS frame can be detected prior to transmitting the burst. Exemplary RTS and CTS frames can be found in any of the 802.11 standards. For collision avoidance, an access point can send an RTS frame to any station it is associated with and await the CTS response frame from that station. The station selection can be arbitrary or it can be one known to be farthest away. If the CTS response frame is received, the access point can assume there is little interference either internally or from another nearby access point and determine it is free to transmit the RBM burst.

FIG. 7 shows an example of the use of the RTS/CTS for collision avoidance. The access point sends RTS 702 to a designated station. The station responds with CTS frame 704, after which the access point broadcasts DTIM beacon 706, followed by regular BM frames 708 and 710, And then followed by the RBM burst comprising RBM frames 712, 714, and 716. In this embodiment, the RTS/CTS transaction occurs prior to a DTIM beacon. The RTS/CTS transaction can serve as a collision avoidance mechanism for an RBM burst provided it precedes the burst, but not by a significant amount of time. The RTS may be addressed at any station within reach of the access point. The RTS/CTS sequence may also occur after the DTIM beacon but before the RBM burst.

An alternative embodiment is shown in FIG. 8. After the access point broadcast DTIM beacon 802, it transmits regular BM frames 804 and 806, but immediately prior to transmitting the RBM burst, it attempts an RTS/CTS transaction by sending RTS frame 808. However, after a SIFS a CTS frame is not seen indicating there may be a high probability of data collision if a transmission is performed immediately. After a standard backoff period, which is known to those of ordinary skill in the art, another RTS frame 810 is transmitted. This time CTS frame 812 is seen. Recognizing the CTS response, the access point transmits the RBM burst comprising the RBM frames 814, 816, and 818.

Figure 9:
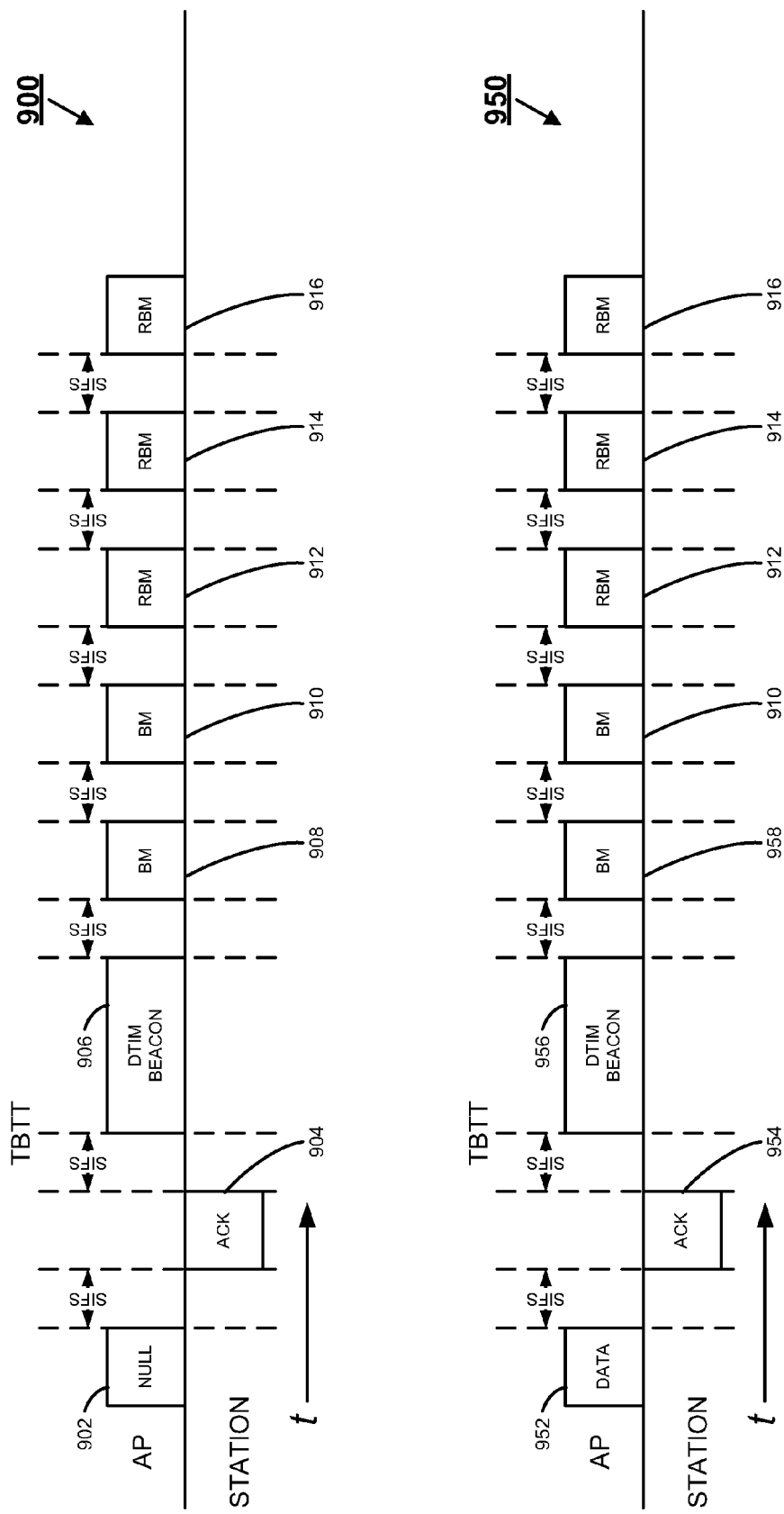
FIG. 9 shows to alternate timelines where alternative transactions are used instead of an RTS/CTS transaction.

FIG. 9 shows to alternate timelines where alternative transactions are used instead of an RTS/CTS transaction. In timeline 900, NULL data frame 902 is sent by the access point to a designated station. The station responds with ACK frame 904. The remainder of the transaction is similar to that described for FIG. 7. Alternatively, in timeline 950, data frame 952 is sent by the access point to a designated station. The station responds with ACK frame 954. The remainder of the transaction is similar to that described for FIG. 7. In both cases, failure to receive an ACK from the station would result in an attempt to retry after a backoff period.

FIG. 10 shows an exemplary timeline where RBM frames are transmitted at a higher rate. RBM frames within an RBM burst are transmitted at a higher PHY rate (i.e., above the basic rate), indicated by RBM frames 1012, 1014 and 1016. In this diagram, the hatching is used to indicate the frame is transmitted at a higher rate. Since not all stations can receive RBM frames at this higher rate, NULL frame 1018 is transmitted with the More Data bit of the frame control field frame (see subfield 618 of frame control field 502 in FIGS. 5 and 6) reset (i.e., set to zero). Furthermore, NULL frame 1018 is transmitted at a basic rate so all stations in the network can see that the More Data bit is reset so they know the BM burst is over. If there is no other multicast data, the stations can elect to go back to sleep. A NULL frame need only be transmitted following a RBM burst transmitted at a higher rate.

In certain circumstances, if the RBM stream does not need to be received by non-RBM capable stations, then the RBM stream can be transmitted outside of the DTIM BM period which follows a DTIM beacon frame. To notify when to expect RBM bursts, the access point can announce a RBM TXOP schedule.

FIG. 11 shows an exemplary format for a RBM TXOP schedule element. This element can be included within a beacon frame. It can be incorporated into a RBM TXOP announcement frame which can be transmitted in several ways. The RBM TXOP announcement can be a unicast frame transmitted to those stations known to be receiving the RBM stream. If a station is in power save mode, a power save procedure can be used such as using a TIM which is checked periodically by the station to indicate data is awaiting the station. The station can then retrieve it using a power save poll (PS-Poll) message, techniques known in the art, especially as related to 802.11. Another method is to include the RMB TXOP announcement in the beacon. The RMB TXOP announcement can further be included as part of a probe response. Stations can also inquire as to properties of an access point by transmitting a probe request frame. In response to a probe request, an access point transmits a probe response which comprises many of the same parameter sets and informational elements as is present in the beacon frame. The RBM TXOP Schedule element can also be included in such a probe response.

Element ID field 1102 is a one octet field set to indicate the element is a RBM TXOP schedule element. Length field 1104 is a one octet indicating the combined length of the remaining fields. In this case, that value is 8. RBM TXOP start interval field 1106 is a four octet field which indicates the time in time units (typically microseconds) relative to the TBTT when the first RBM TXOP begins. During the RBM TXOP a RBM burst is transmitted and can incorporate any or all of the improvements discussed above, including the RTS/CTS transaction, higher rate transmission of the RBM frames and concluding with a NULL or Data frame with a more data bit set to zero. RBM TXOP service interval field 1108 is a four octet field, which indicates in time units, the time between successive RBM TXOPs start times. In some cases, it is desirable to have more than one RBM TXOP in the present beacon interval. The RBM TXOP service interval specifies the temporal space between successive RBM TXOPs in the present beacon interval. A value of zero could be used to indicate there is only one RBM TXOP per beacon interval.

FIG. 12 illustrates a typical timing using a RBM TXOP schedule. In the illustrated example, beacon frame 1202 comprises RBM TXOP schedule element 1204. RBM bursts 1206, 1208 and 1210 can include any of the improvements mentioned above, including the CTS/RTS collision avoidance, higher rate RBM transmission and NULL or final Data frame with the more data bit set to zero. The first RBM TXOP places a RBM TXOP start interval after the TBTT where RBM burst 1206 begins. RBM burst 1208 begins a RBM TXOP service interval after the start of RBM burst 1206. RBM burst 1210 begins a RBM TXOP service interval after the start of RBM burst 1208.

So far, the focus has been on actions the access point can take to make improvements to throughput and reliability. Although an acknowledgement to a BM frame is not practical, some feedback mechanisms can improve reliability.

FIG. 13 illustrates a format for feedback to the access point for a specific RBM stream. The RBM feedback frame can be used generally for conveying issues regarding a particular BM stream, but specifically can be used to report quality statistics, such as the PER, RSSI or to report a suggested PHY rate where the station would like to receive the RBM stream. In response, the access point may transmit the RBM stream at the lower or higher PHY rate or may continue by weighing in all the factors. It doesn't make sense for an access point to lower the rate if at even the lower rate a particular station has too high a PER. The access point may not lower the rate to accommodate a single station which might be at the fringe of communications capability. However, if all stations benefit from a lower rate then the access point can transmit the RBM stream at a lower rate. One of ordinary skill in the art would be able to weigh the various factors to derive a suitable formula for the access point to administer the transmission rate.

More specifically, MAC header 1302 is the standard MAC header described in FIG. 5. Category field 1304 is set to the value indicating the RBM category. Action field 1306 is set to the value indicating RBM feedback frame. Length field 1308 is set to 6+n, where n indicates the size of the feedback field. Multicast group address field 1310 is set to the MAC address corresponding to the multicast group for which feedback is included in the frame. RBM feedback field 1312 contains feedback information to be sent to the access point regarding the particular RBM stream. RBM feedback field 1312 could further comprise subfields or a single field. This field or subfields could indicate the PER and/or a suggested rate and/or the MCS, if applicable (e.g., 802.11n) and/or the RSSI for the specific RBM stream. The RBM feedback field 1312 can be a generalized format for incorporating some or all of these quality factors.

In some wireless standards, such as 802.11n, various MCSs are used. The feedback mechanisms used to determine the optimal MCS can be used. Typically, to determine the optimal MCS to reach a specific station, the access point sends an MCS request (MRQ) through a high throughput control (HTC) field in an extended MAC header. In response, the station responds with MCS feedback (MFB) information through the HTC field. The MFB contains the recommended MCS. When a station signs up to become a member of a specific RBM group, the access point sends an MRQ to the station to determine whether the RBM group is transmitted at the proper PHY modulation. The station responds with MFB information through containing the proper PHY modulation. In another configuration, the station can send the MFB information unsolicited, perhaps by adding the MFB information to an HTC field in the MAC header to frames used by the station to sign up for a particular RBM group.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:

1. A method for broadcasting a data burst, the method comprising:
   marking each of a first number of frames in the data burst to identify each frame of the first number of frames as a reliable broadcast/multicast (RBM) frame, wherein a second number of frames in the data burst are broadcast/multicast (BM) frames not marked to be identified as the RBM frame;
   transmitting a message to a station for collision avoidance;
   receiving a response to the message from the station;
   transmitting each RBM frame in the data burst separated by a short interframe space (SIFS) only after the transmitting of the message and the receiving of the response; and
   transmitting each BM frame in the data burst separated by the SIFS before or after the transmitting of the message.

2. The method of claim 1, wherein the message is a request to send frame and the response is a clear to send frame.

3. The method of claim 1, wherein the message is a NULL frame and the response is an acknowledgement frame.

4. The method of claim 1, wherein the message is a data frame and the response is an acknowledgement frame.

5. The method of claim 1, wherein the transmitting of each RBM frame is at a higher physical layer (PHY) rate than the transmitting of each BM frame.

6. The method of claim 5, wherein the higher PHY rate is adjusted based on receiving a RBM feedback frame.

7. The method of claim 6, wherein the RBM feedback frame comprises a packet error rate (PER).

8. The method of claim 6, wherein the RBM feedback frame comprises a received signal strength indication (RSSI).

9. The method of claim 6, wherein the RBM feedback frame comprises report a suggested PHY rate.

10. The method of claim 6, wherein the RBM feedback frame comprises a modulation coding scheme (MCS).

11. The method of claim 1 further comprising:
    if the response is not received, waiting a backoff period; and
    if the response is not received, retransmitting the message.

12. The method of claim 1 wherein the transmitting each frame occurs after the transmission of a delivery traffic indication map (DTIM) beacon frame.

13. A method for broadcasting a reliable broadcast/multicast (RBM) burst, the method comprising:
    marking each frame in the RBM burst to identify each frame as reliable;
    transmitting a message to a station for collision avoidance;
    receiving a response from the station; and
    transmitting each frame in the RBM burst separated by a short interframe space (SIPS) after receiving the response;
    wherein the transmitting each frame begins after a set interval after a target beacon transmission time (TBTT), wherein the set interval is equal to an RBM transmit opportunity (TXOP) start interval plus a non-negative multiple of an RMB TXOP service interval.

14. The method of claim 13, wherein the RBM TXOP service interval and the RBM TXOP start interval are announced in a beacon frame or transmitted in a probe response.

15. An access point configured for broadcasting a data burst, said access point comprising:
    a processor;
    a wireless network interface device; and
    a memory comprising instructions;
    said instructions causing the processor to:
       mark each of a first number of frames in the data burst to identify each frame of the first number of frames as a reliable broadcast/multicast (RBM) frame, wherein a second number of frames in the data burst are broadcast/multicast (BM) frames not marked to be identified as the RBM frame;
       cause the wireless network interface device to transmit a message to a station for collision avoidance;
       cause the wireless network interface device to receive a response to the message from the station;

cause the wireless network interface device to transmit each RBM frame in the data burst separated by a short interframe space (SIFS) only after the transmitting of the message and the receiving of the response; and
cause the wireless network interface device to transmit each BM frame in the data burst separated by the SIFS before or after the transmitting of the message.

16. The access point of claim 15, wherein the message is a request to send frame and the response is a clear to send frame.

17. The access point of claim 15, wherein the message is a NULL frame or a data frame and the response is an acknowledgement frame.

18. The access point of claim 15, wherein the instructions cause the processor to transmit through the wireless network interface device each RBM frame on the broadcast or multicast burst at a higher PHY rate than each BM frame.

19. The access point of claim 18, wherein the higher PHY rate is adjusted based on receiving a reliable broadcast/multicast feedback frame.

20. The access point of claim 19, wherein the RBM feedback frame comprises a PER, an RSSI, a suggested PHY rate, an MCS, or a combination thereof.

21. The access point of claim 15, wherein if no response is received, the instructions cause the processor to wait a backoff period and to cause the wireless network interface device to retransmit the message.

22. The access point of claim 15, wherein the processor causes the wireless network interface device to transmit the first frame of the RBM burst after the transmission of a DTIM beacon frame.

23. An access point configured for broadcasting a reliable broadcast/multicast (RBM) burst, the access point comprising:
a processor;
a wireless network interface device; and
a memory comprising instructions;
said instructions causing the processor to:
mark each frame in the RBM burst to identify each frame as reliable;
cause the wireless network interface device to transmit a message to a station for collision avoidance;
cause the wireless network interface device to receive a response to the message from the station; and
cause the wireless network interface device to transmit each frame in the RBM burst separated by a short interframe space (SIFS) after receiving the response;
wherein said instructions causing the processor to cause the wireless network interface device to begin transmitting each frame of the RBM burst after a set interval after a target beacon transmission time (TBTT), wherein the set interval is equal to an RBM transmit opportunity (TXOP) start interval plus a non-negative multiple of an RMB TXOP service interval.

24. The access point of claim 23, wherein the RBM TXOP service interval and the RBM TXOP start interval are announced in a beacon frame or transmitted in a probe response.

25. A method for broadcasting a reliable broadcast/multicast (RBM) burst, the method comprising:
marking each frame in the RBM burst to identify each frame as reliable;
transmitting a message to a station for collision avoidance;
receiving a response to the message from the station; and
transmitting each frame in the RBM burst separated by a short interframe space (SIFS) after receiving the response;
wherein the message is a NULL frame and the response is an acknowledgement frame.

26. An access point configured for broadcasting a reliable broadcast/multicast (RBM) burst, the access point comprising:
a processor;
a wireless network interface device; and
a memory comprising instructions;
said instructions causing the processor to:
mark each frame in the RBM burst to identify each frame as reliable;
cause the wireless network interface device to transmit a message to a station for collision avoidance;
cause the wireless network interface device to receive a response to the message from the station; and
cause the wireless network interface device to transmit each frame in the RBM burst separated by a short interframe space (SIFS) after receiving the response;
wherein the message is a NULL frame and the response is an acknowledgement frame.

* * * * *